March 8, 1927.  W. C. SMITH  1,619,892

CLUTCH DEVICE

Filed April 13, 1925

Inventor: William C. Smith,
by Toulmin & Toulmin, Attorneys.

Patented Mar. 8, 1927.

1,619,892

UNITED STATES PATENT OFFICE.

WILLIAM CHARLES SMITH, OF BRISTOL, ENGLAND.

CLUTCH DEVICE.

Application filed April 13, 1925, Serial No. 22,820, and in Great Britain April 15, 1924.

This invention relates to a clutch device for variable speed gearing for motor cars, lathes, and like machinery which is designed to apply the driving force as far away as possible from the axis of the shaft, and to be of simple and thereby cheap manufacture, efficient, and reliable.

The invention consists essentially in a new arrangement and combination of parts, characterized in that the loose elements displaced by a grooved rod are balls adapted to operate a second loose slidable element outside the shaft, which directly and positively engages said wheel, the engaging elements being as far away as possible from the axis of the shaft.

Referring to the drawings filed herewith, which illustrate, as an example only, a particular construction of the device, in which use is made of a stirrup or dog adapted to engage internal recesses in the periphery of each wheel when displaced by loose elements, such as balls, disposed in apertures provided in a splined sleeve slidably mounted on the grooved shaft:—

Figs. 1ª, 1ᵇ, 1ᶜ illustrate the arrangement of the grooved shaft and splined sleeve;

Figs. 2ª, 2ᵇ are views of the stirrup or dog;

Figs. 3ª, 3ᵇ are views of a carrier member for the said stirrup or dog;

Figure 1A:
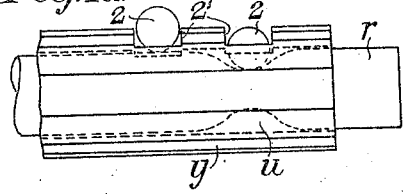
Figure 1B:
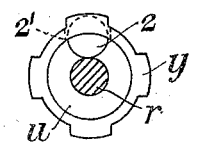
Figure 1C:
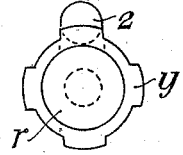

The splined sleeve $y$ is slidably mounted on the spindle $r$, provided with tranverse grooves, one of which is shown at $u$ (Fig. 1ª); the sleeve is provided with apertures $2'$ in which are disposed the balls 2, 2, adapted to move in (Fig. 1ᵇ) and out (Fig. 1ᶜ) relatively to the sleeve when the spindle $r$ is displaced longitudinally thereof, according as a groove, or a portion of the spindle having the full diameter, is under any one of the said balls.

Figure 2A:
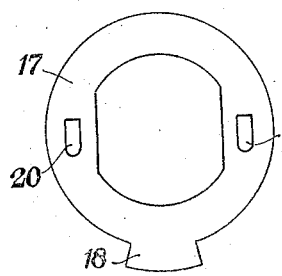
Figure 2B:
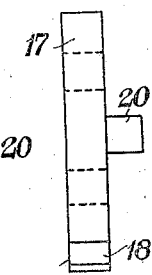
Figure 3A:
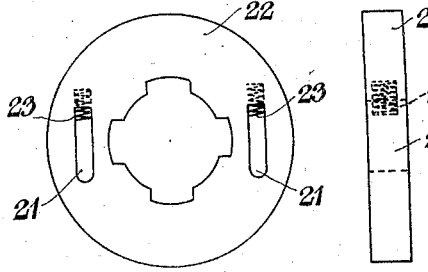
Figure 3B:
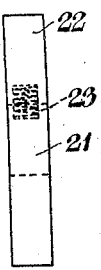
Figure 4:
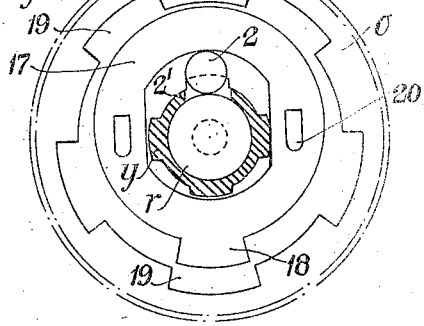
Figs. 4 and 5 show the stirrup or dog in the disengaged and the engaged position, respectively.
Figure 5:
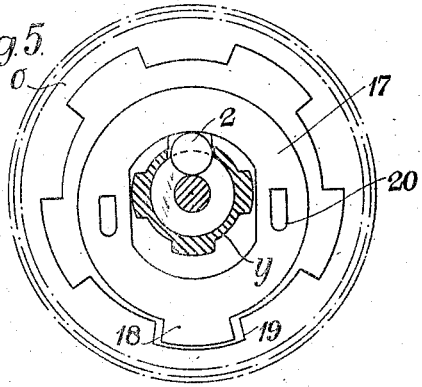
Figure 6:
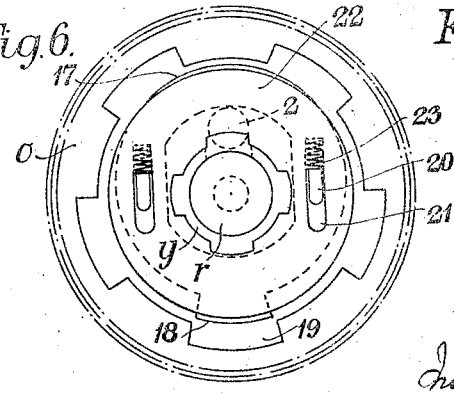
Fig. 6 is a front view of a wheel, showing the arrangement of the several parts.
Figure 7:
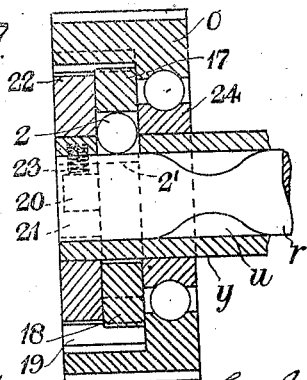
Fig. 7 is a section of the device shown in Fig. 6, longitudinally of the shaft.

Surrounding the sleeve $y$ in the transverse plane through the ball 2, is a stirrup or dog 17 (Figs. 2ª, 2ᵇ, 6 and 7) provided with a peripheral projection or tooth 18 adapted to engage one of a plurality of corresponding internal recesses 19 in the periphery of the wheel $o$. The said stirrup or dog carries on one face two projections 20 adapted to engage corresponding guiding grooves 21 in a carrier disc 22 (Figs. 3ª, 3ᵇ). Springs 23 are, or may be, provided in the said grooves to cause the dog to assume the engaging position as soon as it is allowed to do so by the ball 2 sinking into the groove $u$ (Fig. 5); as soon, however, as the ball is forced out of the groove by the longitudinal movement of the spindle relatively to the sleeve, the dog is forced out of engagement with the wheel (Fig. 4). Adjacent to the dog, on the other side, is a ball bearing 24, on which the wheel $o$ revolves freely when the dog is in the position shown in Fig. 7.

The arrangement just described is particularly adapted to wheels of small diameter and pinions.

The device is applicable to gear drive or belt or chain drive; in the latter case, the wheels $o$ are provided with sprockets or teeth and adapted to carry a silent running chain. A second ball bearing can be provided on the other side of the carrier disc if desired.

What I claim and desire to secure by Letters Patent is:—

1. A clutch device comprising a hollow shaft, with a peripheral orifice, a gear wheel loosely mounted on the shaft, a transversely grooved control rod adapted to slide in the said hollow shaft, a ball element housed in the said peripheral orifice of the hollow shaft and adapted to partly sink into the transverse groove of said rod and to be forced outwardly partially through the orifice in said shaft by the full portions of said control rod when same is displaced longitudinally, a detached slidable member surrounding said shaft and revolving therewith and bearing against said ball element, resilient elements urging said slidable member against the ball element in the orifice of the shaft, and a projection on the said slidable member adapted to engage a corresponding recess on the gear wheel.

2. A clutch device as claimed in claim 1, a ball bearing for said gear wheel, and a slotted carrier disc adapted to guide said slidable member, said slidable member being mounted between said ball bearing and said slotted carrier.

3. A clutch device comprising a hollow shaft with a peripheral orifice, a gear wheel loosely mounted on said shaft, a transversely grooved control rod adapted to slide in said hollow shaft, a ball element housed in said peripheral orifice of the hollow shaft and adapted to partly sink into the transverse groove of said rod and to be forced outwardly partially through the orifice in said shaft by the full portions of said control rod when same is displaced longitudinally, a detached slidable member surrounding said shaft and revolving therewith and bearing against said ball element, resilient elements urging said slidable member against the ball element in the orifice of the shaft, a projection on said slidable member adapted to engage a corresponding recess on said gear wheel, a ball bearing for said gear wheel, a slotted carrier disc adapted to guide said slidable member, said slidable member being mounted between said ball bearing and said slotted carrier, and said resilient elements being mounted on said carrier disc and adapted to maintain said slidable member in engagement with said gear wheel, until forced out of engagement therewith by the movement of said rod longitudinally of said shaft.

In testimony whereof, I affix my signature.

WILLIAM CHARLES SMITH.